(12) United States Patent
Han et al.

(10) Patent No.: US 9,285,626 B2
(45) Date of Patent: Mar. 15, 2016

(54) LIQUID CRYSTAL PANEL AND LIQUID CRYSTAL DISPLAY APPARATUS HAVING THE SAME

(71) Applicant: SAMSUNG ELECTRONICS CO., LTD., Suwon-si (KR)

(72) Inventors: Young-ran Han, Suwon-si (KR); Kyoung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 13/890,793

(22) Filed: May 9, 2013

(65) Prior Publication Data

US 2013/0314650 A1   Nov. 28, 2013

(30) Foreign Application Priority Data

May 22, 2012   (KR) ........................ 10-2012-0054131

(51) Int. Cl.
*G02F 1/1335* (2006.01)
*G02F 1/1333* (2006.01)
*G06F 3/0354* (2013.01)

(52) U.S. Cl.
CPC ...... *G02F 1/133514* (2013.01); *G02F 1/13338* (2013.01); *G02F 1/133512* (2013.01); *G02F 2001/133374* (2013.01); *G06F 3/03545* (2013.01)

(58) Field of Classification Search
CPC ............ G02F 1/13338; G02F 3/03545; G02F 1/133512; G02F 2001/133374; G02F 1/133514

USPC .......................................................... 349/12
See application file for complete search history.

(56) References Cited

U.S. PATENT DOCUMENTS

| | | | |
|---|---|---|---|
| 4,775,765 A * | 10/1988 | Kimura et al. ................ 345/173 |
| 6,597,427 B1 * | 7/2003 | Katsu .................. G02F 1/13338 |
| | | | 349/192 |
| 7,710,408 B2 * | 5/2010 | Ericson ......................... 345/179 |
| 2005/0146516 A1 * | 7/2005 | Nishiyama .................... 345/176 |
| 2009/0115686 A1 * | 5/2009 | Ryou ............................. 345/2.1 |
| 2012/0206415 A1 * | 8/2012 | Miyazaki et al. ............. 345/175 |

FOREIGN PATENT DOCUMENTS

| | | |
|---|---|---|
| EP | 2579129 A2 | 4/2013 |
| JP | 2011-013872 A | 1/2011 |

OTHER PUBLICATIONS

Search Report dated Sep. 2, 2013, issued by the European Patent Office in counterpart European Application No. 13159076.2.

\* cited by examiner

*Primary Examiner* — Charles Chang
(74) *Attorney, Agent, or Firm* — Sughrue Mion, PLLC

(57) ABSTRACT

A liquid crystal panel includes an upper plate, a lower plate, and a liquid crystal layer accommodated between the upper plate and the lower plate. The upper plate includes a front glass substrate, a color filter layer formed on a rear surface of the front glass substrate, and a front polarizing film is attached to a front surface of the front glass substrate. The color filter layer includes a plurality of N color filters and black matrices for separating the color filters from each other. A plurality of patterns for recognizing coordinates are provided on a front side of the upper plate in such a manner that the N color filters correspond to one of the plurality of patterns for recognizing the coordinates, where N is a natural number.

16 Claims, 10 Drawing Sheets

LIQUID CRYSTAL PANEL AND LIQUID CRYSTAL DISPLAY APPARATUS HAVING THE SAME

PRIORITY

This application claims priority under 35 U.S.C. §119(a) to Korean Patent Application No. 10-2012-0054131, filed on May 22, 2012, in the Korean Intellectual Property Office, the disclosure of which is hereby incorporated herein by reference, in its entirety.

BACKGROUND

1. Field

The present inventive concept relates to a liquid crystal panel and a liquid crystal display apparatus having the same, and more particularly to a liquid crystal panel that includes patterns for recognizing coordinates and a liquid crystal display apparatus having the same.

2. Description of the Related Art

A liquid crystal display is a representative display apparatus that uses a liquid crystal layer of which the molecular arrangement is changed, depending on a voltage applied thereto to cause a change to the optical properties thereof.

The liquid crystal display includes an upper plate and a lower plate, and a liquid crystal layer is disposed between the upper and lower plates. In general, the upper plate includes a color filter layer for implementing a color image, and the color filter layer is composed of a plurality of color filters and black matrices that form boundaries between the color filters.

Recently, display devices have appeared that can perform note-taking or drawing according to a touch by a user, in addition to a simple display of an image, and the representative application field may be an electronic board. Such display devices can achieve the note-taking or drawing function, for example, by calculating coordinate values of a screen region that a user touches with an electronic pen and by driving pixels that correspond to the calculated coordinate values.

The liquid crystal display may adopt a coordinate recognition method which integrally forms patterns for recognizing the coordinates on the black matrices of the color filter layer and calculates the coordinate values of the touched screen region based on position information included in the patterns.

SUMMARY

The present inventive concept has been made to address at least the above problems and/or disadvantages and to provide at least the advantages described below. Accordingly, an aspect of the present inventive concept provides a liquid crystal panel that can be provided with patterns for recognizing coordinates in a simple and inexpensive manner in comparison with the related art and provides a liquid crystal display apparatus having the same.

According to one aspect of the present inventive concept, a liquid crystal panel includes an upper plate, a lower plate, and a liquid crystal layer accommodated between the upper plate and the lower plate, wherein the upper plate includes a front glass substrate, a color filter layer formed on a rear surface of the front glass substrate, and a front polarizing film attached to a front surface of the front glass substrate, the color filter layer includes a plurality of color filters and black matrices for separating the color filters from each other, and a plurality of patterns for recognizing coordinates are provided on a front side of the upper plate in a manner that the N color filters correspond to one of the plurality of patterns for recognizing the coordinates, where N is a natural number.

Each of the patterns for recognizing the coordinates may be disposed to overlap any one of the corresponding N color filters.

The liquid crystal panel according to the aspect of the present inventive concept may further include a pattern film attached to the front polarizing film, and the patterns for recognizing the coordinates may be formed on the pattern film.

The pattern film may be made of glass or polyethylene terephthalate (PET).

The patterns for recognizing the coordinates may be directly formed on the front polarizing film.

The patterns for recognizing the coordinates may be disposed so as not to overlap the black matrices.

The N may be "1."

The patterns for recognizing the coordinates may contain the same material as the black matrices.

The patterns for recognizing the coordinates may be made of carbon black.

According to another aspect of the present inventive concept, a display apparatus includes the above-described liquid crystal panel.

The display apparatus may be an electronic board.

In another aspect of the present inventive concept, the liquid crystal panel may include an upper plate, a color filter layer including a plurality of color filters and black matrices for separating the color filters, and a front side of the upper plate including a plurality of patterns which recognize coordinates in a manner that the color filters correspond to one of the plurality of patterns for recognizing the coordinates.

BRIEF DESCRIPTION OF THE DRAWINGS

The above and other aspects, features and advantages of the present inventive concept will be more apparent from the following detailed description when taken in conjunction with the accompanying drawings, in which.

DETAILED DESCRIPTION OF THE EXEMPLARY EMBODIMENTS

Hereinafter, a liquid crystal panel and a liquid crystal display apparatus having the same according to exemplary embodiments of the present inventive concept are described in detail with reference to the accompanying drawings.

Figure 1:
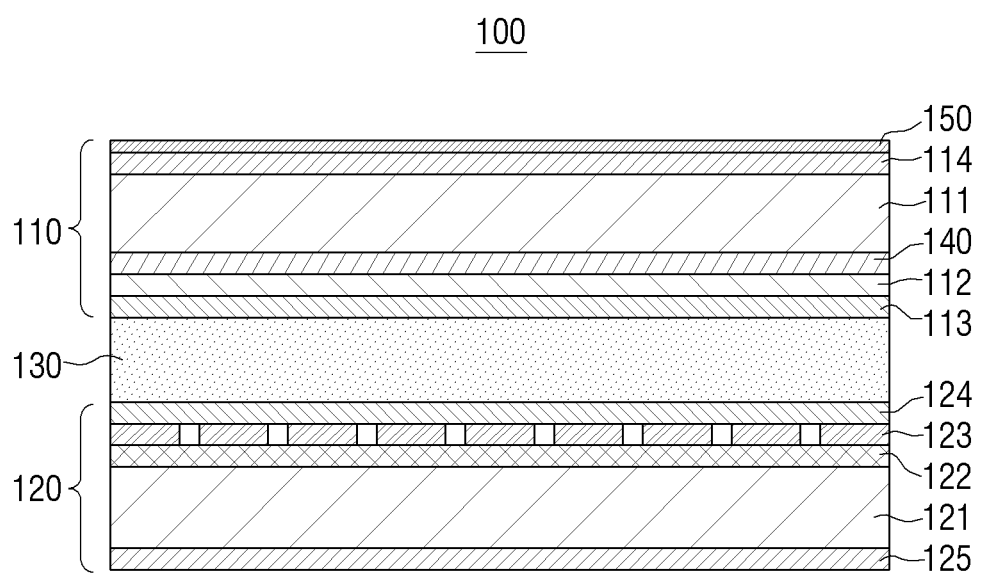
FIG. 1 is a schematic cross-sectional view illustrating a liquid crystal panel according to an exemplary embodiment of the present inventive concept.
Figure 2:
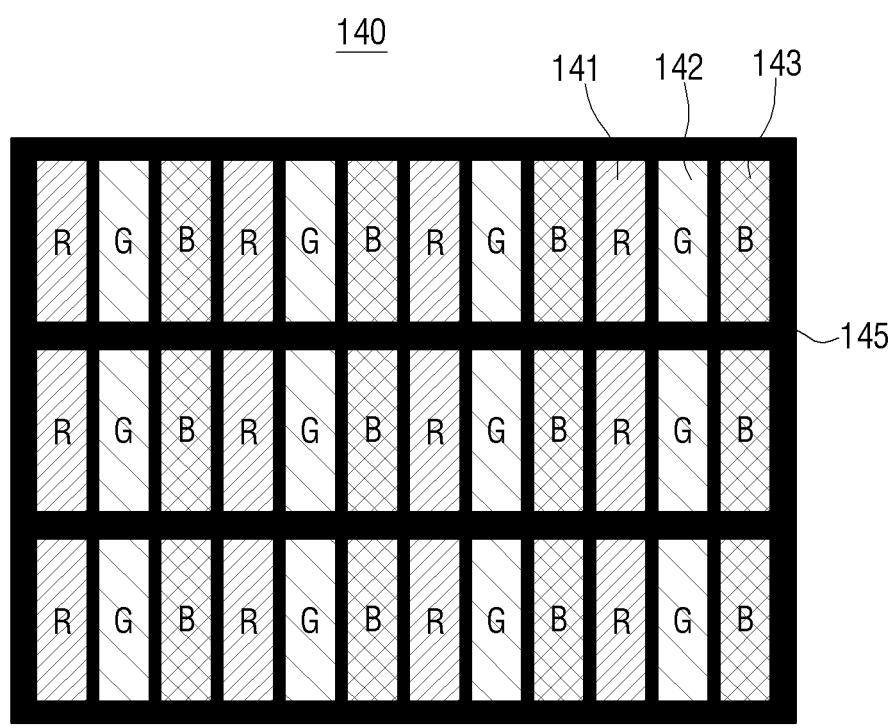
FIG. 2 is a schematic plan view illustrating a color filter layer provided on the liquid crystal panel of FIG. 1.

FIG. 1 is a schematic cross-sectional view illustrating a liquid crystal panel according to an exemplary embodiment of the present inventive concept. FIG. 2 is a schematic plan view illustrating a color filter layer provided on the liquid crystal panel of FIG. 1, and FIG. 3 is a schematic plan view illustrating a pattern film provided on the liquid crystal panel of FIG. 1.

Figure 3:
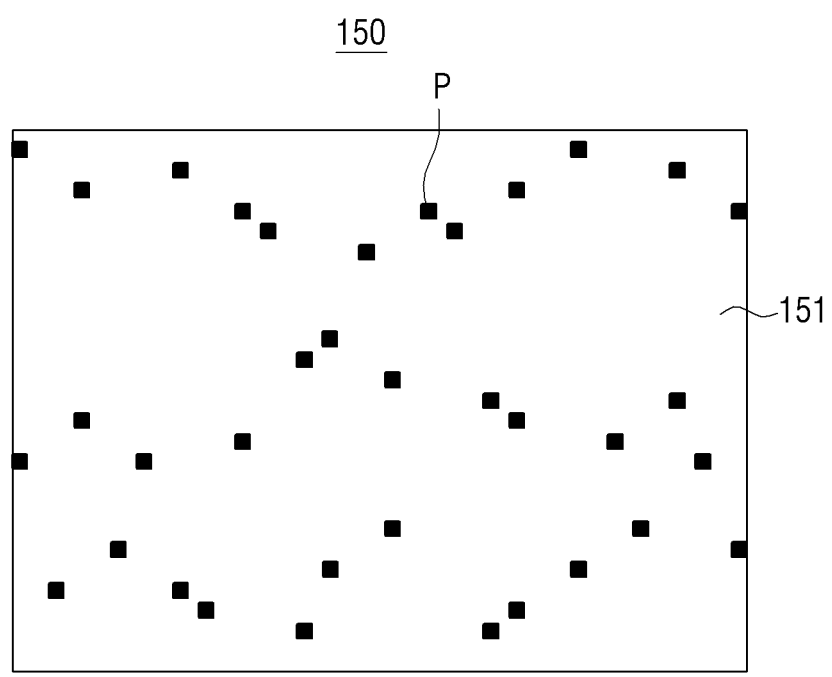
FIG. 3 is a schematic plan view illustrating a pattern film provided on the liquid crystal panel of FIG. 1.

Referring to FIGS. 1 to 3, a liquid crystal panel 100 includes an upper plate 110, a lower plate 120, and a liquid crystal layer 130 disposed between the upper plate 110 and the lower plate 120.

The upper plate 110 includes a front glass substrate 111. On the rear surface side of the front glass substrate 111, a color filter layer 140, a common electrode 112, and an alignment film 113 are disposed in order. On the front surface side of the front glass substrate 111, a front polarizing film 114 and a pattern film 150 are disposed.

As illustrated in FIG. 2, the color filter layer 140 is composed of a plurality of color filters 141, 142, and 143 regularly arranged and black matrices 145 that correspond to boundary regions between the color filters 141, 142, and 143.

The color filters 141, 142, and 143 include a red (R)-color filter 141, a green (G)-color filter 142, and a blue (B)-color filter 143 that correspond to the three primary colors of light, i.e., red, green and blue. A group that is composed of one R-color filter 141, one G-color filter 142, and one B-color filter 143 corresponds to one pixel of the liquid crystal panel 100. Light that has passed through the liquid crystal layer 130 passes through the color filters 141, 142, and 143 of the color filter layer 140. a Since the color filters 141, 142, and 143 having three colors constitute one pixel, each pixel can represent various colors.

The black matrices 143 are formed between the color filters 141, 142, and 143 so as to separate the color filters 141, 142, and 143 from each other. That is, the black matrices 145 correspond to the boundary regions between the color filters 141, 142, and 143. The black matrices 145 are black and thus have light absorption properties. The black matrices 145 function to prevent light incident from the outside from being reflected and to intercept interferences between the lights having passed through the color filters 141, 142, and 143. The black matrices 145 may be made of a metallic material such as chrome (Cr) or an organic material such as carbon black. In this exemplary embodiment, the black matrices 145 are made of carbon black.

As illustrated in FIG. 3, the pattern film 150 includes a rectangular film body 11 and a plurality of patterns 151 for recognizing coordinates which are formed on one surface (for example, an upper surface) of the film body 151. The film body 151 is made of a transparent material, for example, glass or polyethylene terephthalate (PET). In this exemplary embodiment, the film body 151 is made of tempered glass. For example, the pattern film 150 may be attached to the front polarizing film 114 that is disposed on the lower side thereof in a UV coating process. The patterns 151 for recognizing the coordinates are made of a black material to absorb light, and for example, may be made of carbon black in the same manner as the black matrices 145. The patterns 151 for recognizing the coordinates may be formed on the film body 151 through a printing process. The patterns 151 for recognizing the coordinates will be described in more detail later.

The lower plate 120 includes a rear glass substrate 121. On the rear surface of the rear glass substrate 121, a rear polarizing film 125 is disposed, and on the front side of the rear glass substrate 121, a TFT array 122, pixel electrodes 123, and an alignment film 124 are disposed.

The TFT array 122 is composed of a plurality of transistors for applying a voltage to the liquid crystal layer, and according to switching operations of the transistors, the voltage between the common electrode 112 of the upper plate 110 and the pixel electrodes 123 of the lower plate 120 is adjusted. Further, through such voltage adjustment, the structure of the molecular arrangement of the liquid crystal layer 130 is changed. Thus, the light transmission rate through the liquid crystal layer 130 is adjusted.

The alignment film 113 of the upper plate 110 and the alignment film 124 of the lower plate 120 are thin organic films (for example, polyimide) which arrange the liquid crystal layer 130 in a specified direction. On the other hand, the front polarizing film 114 of the upper plate 110 and the rear polarizing film 125 of the lower plate 120 have polarizing axes which are orthogonal to each other. Since the alignment films 113 and 124 and the polarizing films 114 and 125 are already well known, the detailed description thereof will be omitted.

Next, referring to FIGS. 4 to 7, the pattern film 150 will be described in more detail.

Figure 4:
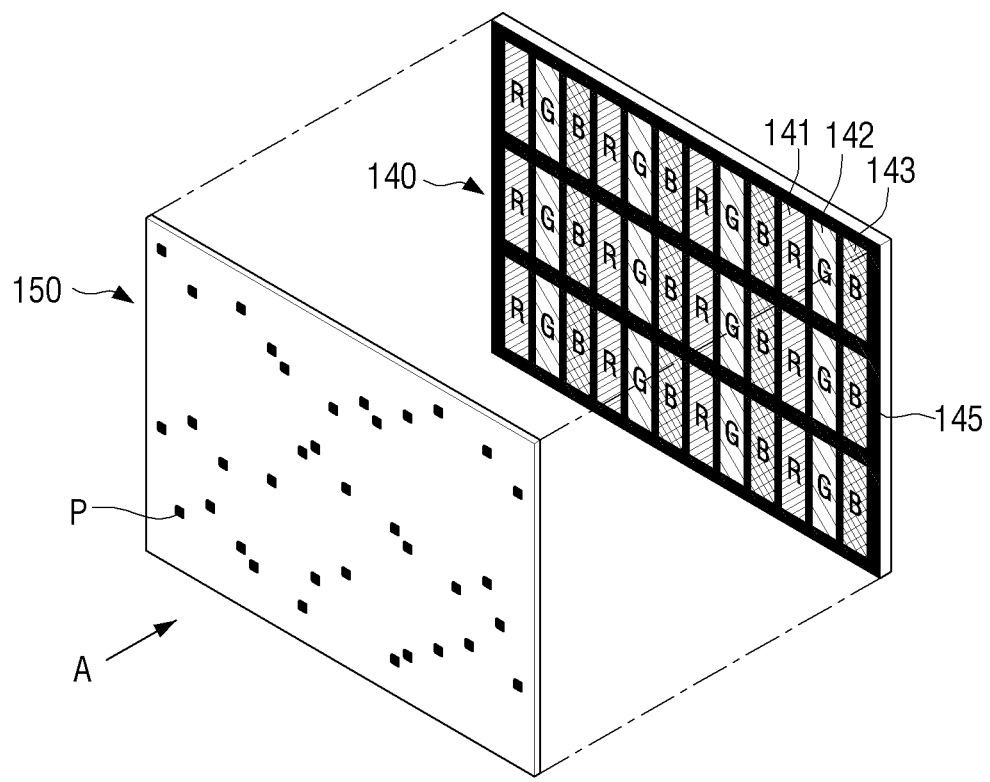
FIG. 4 is a perspective view illustrating an arrangement relationship between the color filter layer of FIG. 2 and the pattern film of FIG. 3.
Figure 5:
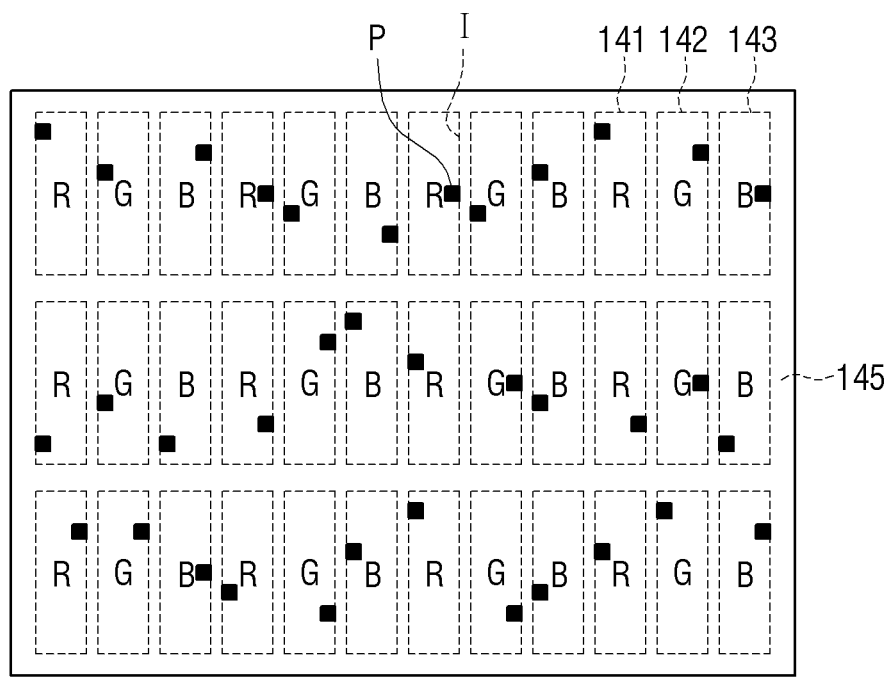
FIG. 5 is a view in which the color filter layer is projected onto the pattern film to explain the arrangement of the patterns for recognizing the coordinates on the pattern film.

FIG. 4 is a perspective view illustrating an arrangement relationship between the color filter layer 140 of FIG. 2 and the pattern film 150 of FIG. 3, and FIG. 5 is a view in which the color filter layer is projected onto the pattern film to explain the arrangement of the patterns for recognizing the coordinates on the pattern film.

Referring again to FIG. 1, the front glass substrate 111 and the front polarizing film 114 are actually disposed between the color filter layer 140 and the pattern film 150. However, as shown in FIG. 4, if the color filter layer 140 and the pattern film 150 are seen from the direction A (that is, in the front) without considering the front glass substrate 111 and the front polarizing film 114, FIG. 5 is obtained. In other words, FIG. 5 is a view in which the color filter layer 140 is projected onto the pattern film 150.

Referring to FIG. 5, the patterns P for recognizing the coordinates of the pattern film 150 are provided in such a manner that the N color filters 141, 142, and 143 correspond to one of the patterns P for recognizing the coordinates, where N is a natural number. In FIG. 5, one of the color filters 141, 142, and 143 corresponds to one of the patterns P for recognizing the coordinates, and thus N becomes N=1.

The light having passed through the color filter layer 140 may pass through the pattern film 150 with the luminance thereof reduced due to the black patterns P for recognizing the coordinates. However, since the patterns P are arrange in such a manner that one of the color filters 141, 142, and 143 corresponds to one of the patterns P for recognizing the coordinates, the reduction of the luminance can be disregarded.

The patterns P for recognizing the coordinates are disposed to overlap one region of the corresponding color filters 141, 142, and 143. By contrast, the patterns P for recognizing the coordinates are disposed so as not to overlap the black matrices 145. Further, the patterns P for recognizing the coordinates are arranged along the boundaries I between the corresponding color filters 141, 142, and 143 and the black matrices 145.

On the other hand, although it is illustrated that the patterns P for recognizing the coordinates are in a rectangular shape, the shape of the patterns P for recognizing the coordinates P are not limited thereto and may be diversely changed, and depending on the design conditions.

Figure 6:
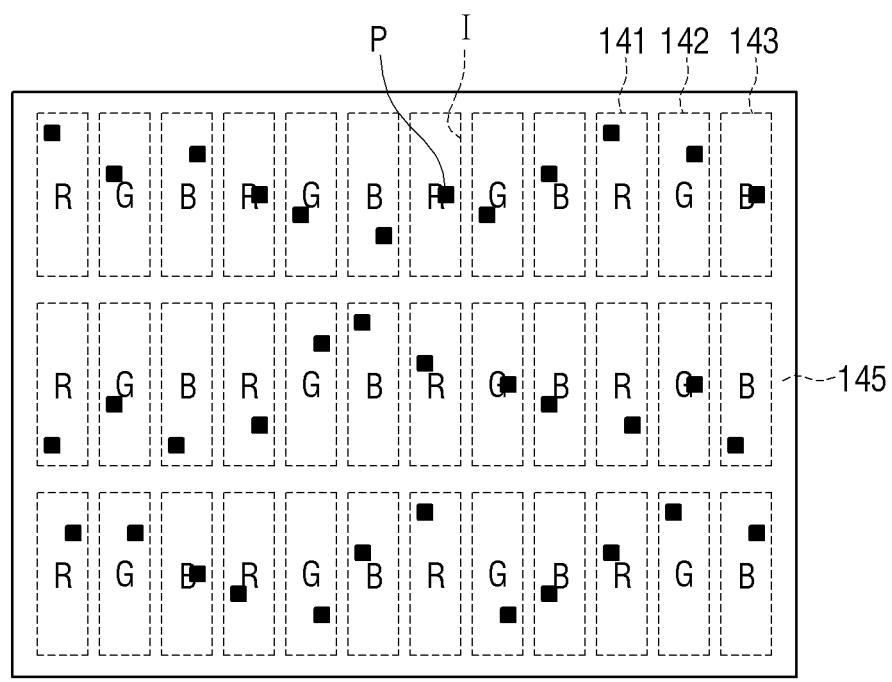
FIG. 6 is a view, which is similar to FIG. 5, illustrating alternative patterns for recognizing the coordinates.

FIG. 6 is a view, which is similar to FIG. 5, illustrating alternative patterns for recognizing the coordinates.

The patterns P for recognizing the coordinates illustrated in FIG. 6 are not arranged along the boundaries I between the color filters 141, 142, and 143 and the black matrices 145, but differ from the patterns P for recognizing the coordinates illustrated in FIG. 5 on the point that the patterns P for recognizing the coordinates are slightly spaced from the boundaries I. As described above, it is not necessary that the patterns P for recognizing the coordinates become in contact with the boundaries I between the color filters 141, 142, and 143 and the black matrices 145.

Figure 7:
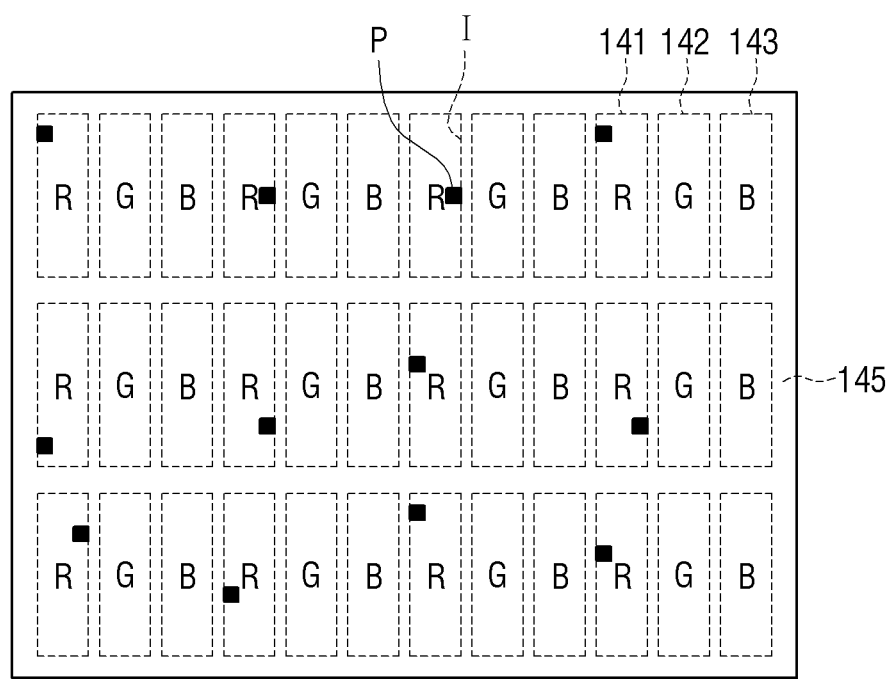
FIG. 7 is a view, which is similar to FIG. 5, illustrating other alternative patterns for recognizing the coordinates.

FIG. 7 is a view, which is similar to FIG. 5, illustrating other alternative patterns for recognizing the coordinates.

The patterns P for recognizing the coordinates as illustrated in FIG. 5 are arranged in a manner that one of the patterns P for recognizing the coordinates corresponds to one of the color filters 141, 142, and 143. However, as illustrated in FIG. 7, the patterns P for recognizing the coordinates may be arranged in such a manner that one of the patterns P for recognizing the coordinates corresponds to the three color filters 141, 142, and 143. That is, FIG. 7 illustrates a case where N becomes N=3. As described above, by making one of the patterns P for recognizing the coordinates correspond to the plurality of color filters 141, 142, and 143, the reduction of the luminance due to the patterns P for recognizing the coordinates can be further improved. In this case, however, it should be considered that the accuracy of the coordinate recognition may be relatively lowered.

The liquid crystal panel 100 provided with the patterns P for recognizing the coordinates according to this exemplary embodiment can perform a note-taking or drawing function, for example, using an electronic pen. In this case, calculation of the coordinate values of the screen through the electronic pen will be described, as follows.

In general, the electronic pen includes a light source (for example, IR LED), a camera (for example, IR camera), and a controller. In response to a user touching a screen region of the liquid crystal display panel 100 with the electronic pen, light (for example, IR) emitted from the light source of the electronic pen is reflected by the liquid crystal panel 100 and then is sensed by the camera. The controller can calculate the coordinate values of the point that is touched by the electronic pen through analysis of an image that is captured through the above-described process.

More specifically, the image captured by the camera may include several images of the patterns P for recognizing the coordinates, and the control may calculate the coordinate values of the touched screen point based on the position information provided by the captured patterns P for recognizing the coordinates.

For example, each of the patterns P for recognizing the coordinates is positioned to overlap the corresponding color filters 141, 142, and 143 and is disposed in one position that is designated among M (a natural number) positions. For example, if M is M=7, each of the patterns P for recognizing the coordinates has position information that is any one of 0, 1, 2, 3, 4, 5, and 6. By calculating the coordinate values through combination of four patterns P for recognizing the coordinates, about 2400 (7×7×7×7=2401) coordinate values are calculated with respect to X and Y axes by the hepta-notation principle. Of course, the number of cases (that is, M) where the patterns P for recognizing the coordinates are disposed in the color filter may be changed, depending on the design conditions.

As described above, according to the liquid crystal panel 100 of this exemplary embodiment, the pattern film 150 on which the patterns P for recognizing the coordinates is attached to the front side of the upper plate 110. Accordingly, in comparison with the liquid crystal display panel in the related art in which the patterns for recognizing the coordinates are integrally formed on the black matrices, the patterns for recognizing the coordinates can be provided in a simple and more inexpensive manner.

Figure 8:
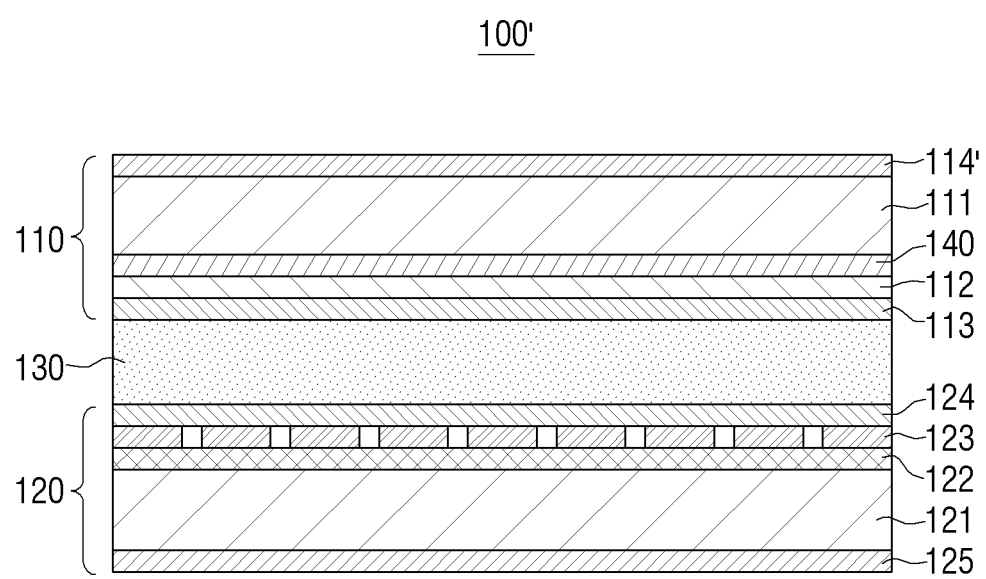
FIG. 8 is a schematic cross-sectional view illustrating a liquid crystal panel according to a second embodiment of the present disclosure.

Next, referring to FIGS. 8 and 9, a liquid crystal panel according to a second exemplary embodiment of the present inventive concept will be described. FIG. 8 is a schematic cross-sectional view illustrating a liquid crystal panel according to a second exemplary embodiment of the present inventive concept, and FIG. 9 is a plan view schematically illustrating a front polarizing film provided on the liquid crystal panel of FIG. 8.

Referring to FIG. 8, a liquid crystal panel 100' illustrated herein is similar to and almost the same as the above-described liquid crystal panel 100 (see FIG. 1), but is different from the liquid crystal panel 100 in that the pattern film 150 is not separately provided, but rather, the patterns P for recognizing the coordinates are formed on a front polarizing film 114'.

Figure 9:
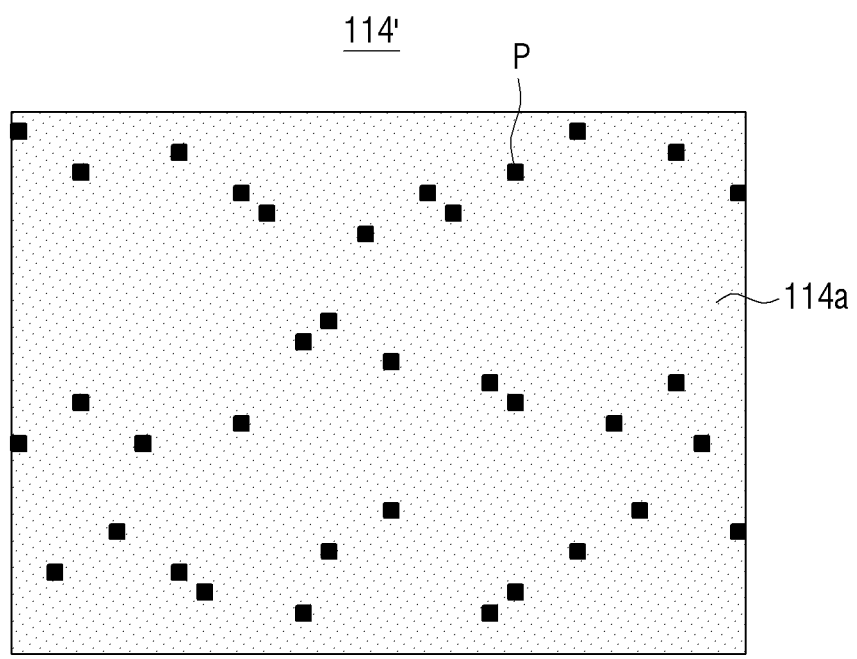
FIG. 9 is a plan view schematically illustrating a front polarizing film provided on the liquid crystal panel of FIG. 8.

Referring to FIG. 9, the front polarizing film 114' includes a film body 114a and patterns P for recognizing coordinates which are formed on one surface (for example, an upper surface) of the film body 114a. Since the patterns P for recognizing the coordinates are the same as the patterns P for recognizing the coordinates formed on the above-described pattern film 150, a duplicate description thereof will be omitted.

In the case of forming the patterns P for recognizing the coordinates on the front polarizing film 114' without providing a separate pattern film 150, the display panel manufacturing process can be further simplified, and the manufacturing cost can be further reduced.

Figure 10:
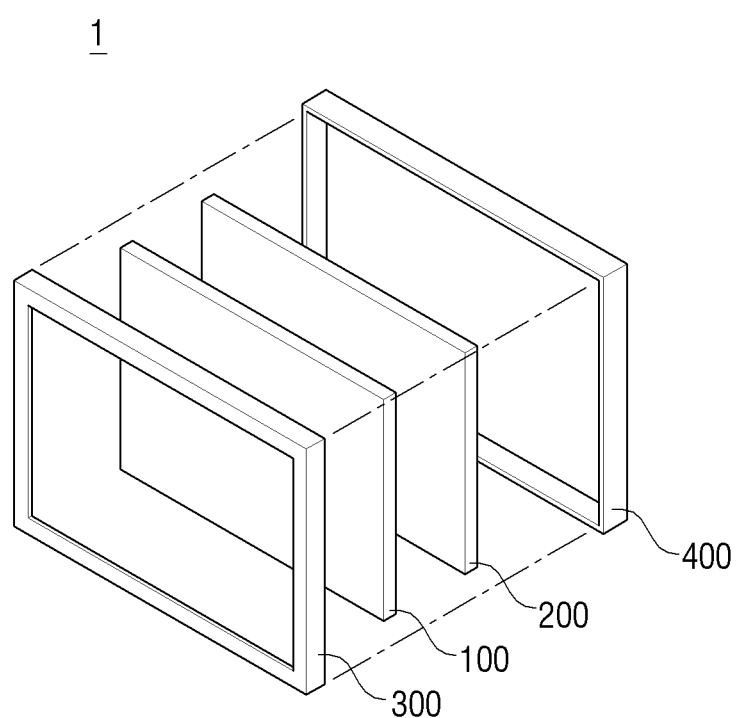
FIG. 10 is a schematic perspective view illustrating a display apparatus according to an exemplary embodiment of the present inventive concept.

Next, a display apparatus to which the above-described liquid crystal panels 100 and 100' will be simply described. FIG. 10 is a schematic perspective view illustrating a display apparatus according to an exemplary embodiment of the present inventive concept. In FIG. 10, the liquid crystal panel 100 according to the first embodiment is applied to the display apparatus, as an example.

Referring to FIG. 10, the display apparatus 1 includes the above-described liquid crystal panel 100, a backlight 200, a front chassis 300, and a rear chassis 400.

The liquid crystal panel 100 is unable to emit light for itself, and receives light from the backlight 200. The backlight 200 is provided with at least one light source such as a fluorescent lamp and an LED. Since the backlight 200 is already well known and is not related to the essential features of the present inventive concept, the detailed description thereof will be omitted.

The front chassis 300 and the rear chassis 400 accommodate and support internal components such as the liquid crystal panel 100 and the backlight 200.

The display apparatus 1 can be applied to several types of displays that can electronically perform the note-taking and/or drawing, and a representative one is an electronic board.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:
1. A liquid crystal panel comprising;
an upper plate, a lower plate, and a liquid crystal layer accommodated between the upper plate and the lower plate,
the upper plate includes a front glass substrate, a color filter layer formed on a rear surface of the front glass substrate, a front polarizing film attached to a front surface of the front glass substrate, and a pattern film attached to the front polarizing film,
the color filter layer includes a plurality of color filters and black matrices for separating the color filters from each other, and
a front side of the upper plate includes a plurality of patterns which recognize coordinates of a screen region in a manner that the N color filters correspond to one of the plurality of patterns for recognizing the coordinates, where N is a natural number,
wherein the plurality of patterns for recognizing the coordinates are formed on the pattern film.
2. The liquid crystal panel as claimed in claim 1, wherein each of the plurality of patterns for recognizing the coordinates is disposed to overlap any one of the corresponding N color filters.
3. The liquid crystal panel as claimed in claim 1, wherein the pattern film is made of glass or polyethylene terephthalate (PET).
4. The liquid crystal panel as claimed in claim 2, wherein the plurality of patterns for recognizing the coordinates are directly formed on the front polarizing film.
5. The liquid crystal panel as claimed in claim 2, wherein the plurality of patterns for recognizing the coordinates are disposed so as not to overlap the black matrices.
6. The liquid crystal panel as claimed in claim 1, wherein the N is "1".
7. The liquid crystal panel as claimed in claim 1, wherein the plurality of patterns for recognizing the coordinates are made of the same material as the black matrices.
8. The liquid crystal panel as claimed in claim 7, wherein the plurality of patterns for recognizing the coordinates are made of carbon black.
9. A display apparatus comprising the liquid crystal panel as claimed in claim 1, further comprising a backlight and front and rear chassis.
10. The display apparatus as claimed in claim 9, wherein the display apparatus is an electronic board.
11. A liquid crystal panel comprising;
an upper plate,
a color filter layer including a plurality of color filters and black matrices for separating the color filters, and
a front side of the upper plate including a plurality of patterns which recognize coordinates of a screen region in a manner that the color filters correspond to one of the plurality of patterns for recognizing the coordinates,
wherein the plurality of patterns for recognizing the coordinates are formed on a pattern film included in the upper plate.
12. The liquid crystal panel as claimed in claim 11, wherein each of the plurality of patterns for recognizing the coordinates is disposed to overlap any one of the corresponding color filters.
13. The liquid crystal panel as claimed in claim 11, wherein the plurality of patterns for recognizing the coordinates are directly formed on a front polarizing film attached to a front surface of a front glass substrate.
14. The liquid crystal panel as claimed in claim 11, wherein the plurality of patterns for recognizing the coordinates are disposed so as not to overlap the black matrices.
15. The liquid crystal panel as claimed in claim 11, wherein the plurality of patterns for recognizing the coordinates are made of the same material as the black matrices.
16. The liquid crystal panel as claimed in claim 11, wherein the plurality of patterns for recognizing the coordinates are made of carbon black.

* * * * *